United States Patent
Takeda et al.

(10) Patent No.: US 6,577,571 B2
(45) Date of Patent: Jun. 10, 2003

(54) OPTICAL DISK RECORDING APPARATUS AND METHOD OF RECORDING DATA ON OPTICAL DISK

(75) Inventors: Naoto Takeda, Tokyo (JP); Kaname Hayasaka, Hanno (JP)

(73) Assignee: TEAC Corporation, Tokyo (JP)

( * ) Notice: Subject to any disclaimer, the term of this patent is extended or adjusted under 35 U.S.C. 154(b) by 96 days.

(21) Appl. No.: 09/829,811

(22) Filed: Apr. 10, 2001

(65) Prior Publication Data

US 2001/0033534 A1 Oct. 25, 2001

(30) Foreign Application Priority Data

Apr. 20, 2000 (JP) .......................................... 2000-119439

(51) Int. Cl.[7] .................................................. G11B 7/00
(52) U.S. Cl. .................. 369/47.53; 369/47.5; 369/53.1; 369/59.11; 369/116
(58) Field of Search ............................. 369/47.1, 47.5, 369/47.51, 47.52, 47.53, 53.1, 53.11, 59.1, 59.11, 59.12, 116

(56) References Cited

U.S. PATENT DOCUMENTS 5,629,913 A * 5/1997 Kaku et al. .................. 369/116
5,732,061 A * 3/1998 Kirino et al. ................ 369/116
5,793,737 A 8/1998 Den Boef

FOREIGN PATENT DOCUMENTS

JP 2000-504467 4/2000

* cited by examiner

Primary Examiner—Muhammad Edun
(74) Attorney, Agent, or Firm—Anderson Kill & Olick; Eugene Lieberstein; Michael N. Meller (57) ABSTRACT

A recording apparatus for an erasable optical disk includes: a first determination part which determines a maximum of modulation degrees of signals reproduced from a test recording area of the optical disk, the signals being recorded in the test recording area with corresponding write power levels different from one another; and a second determination part which determines an optimum write power level corresponding to a target modulation degree obtained from the maximum of the modulation degrees based on a relation between the modulation degrees and the write power levels, wherein the recording apparatus records data on the optical disk with the optimum write power level.

6 Claims, 7 Drawing Sheets

OPTICAL DISK RECORDING APPARATUS AND METHOD OF RECORDING DATA ON OPTICAL DISK

BACKGROUND OF THE INVENTION

1. Field of the Invention

The present invention generally relates to optical disk recording apparatuses and methods of recording data on optical disks, and more particularly to an optical disk recording apparatus that records data on an erasable optical disk and a method of recording data on an erasable optical disk.

2. Description of the Related Art

Direct-read-after-write optical disks are of two general types: write-once and erasable. In overwriting an erasable optical disk, a laser beam having a laser power alternating between a write power Pw and an erase power Pe is employed. In this case, the write power Pw forms pits on the recording film of the optical disk by changing the state of the recording film from a crystalline state to an amorphous state, and the erase power Pe erases the pits by changing the state of the recording film from the amorphous state to the crystalline state.

The Optimum levels of the write and erase powers Pw and Pe (optimum write and erase powers Pwo and Peo) of the laser beam at a time of recording data on an optical disk differ depending on a type of the optical disk, a recording apparatus, and a recording rate. Therefore, in order to set the optimum write and erase powers Pwo and Peo based on the combination of a type of the optical disk, a recording apparatus, and a recording rate employed in a practical recording, a recording power calibration called OPC (Optimum Power Control) is performed prior to the recording of data.

A description will be given of an OPC operation in a conventional optical disk recording apparatus for an erasable optical disk.

Figure 1:
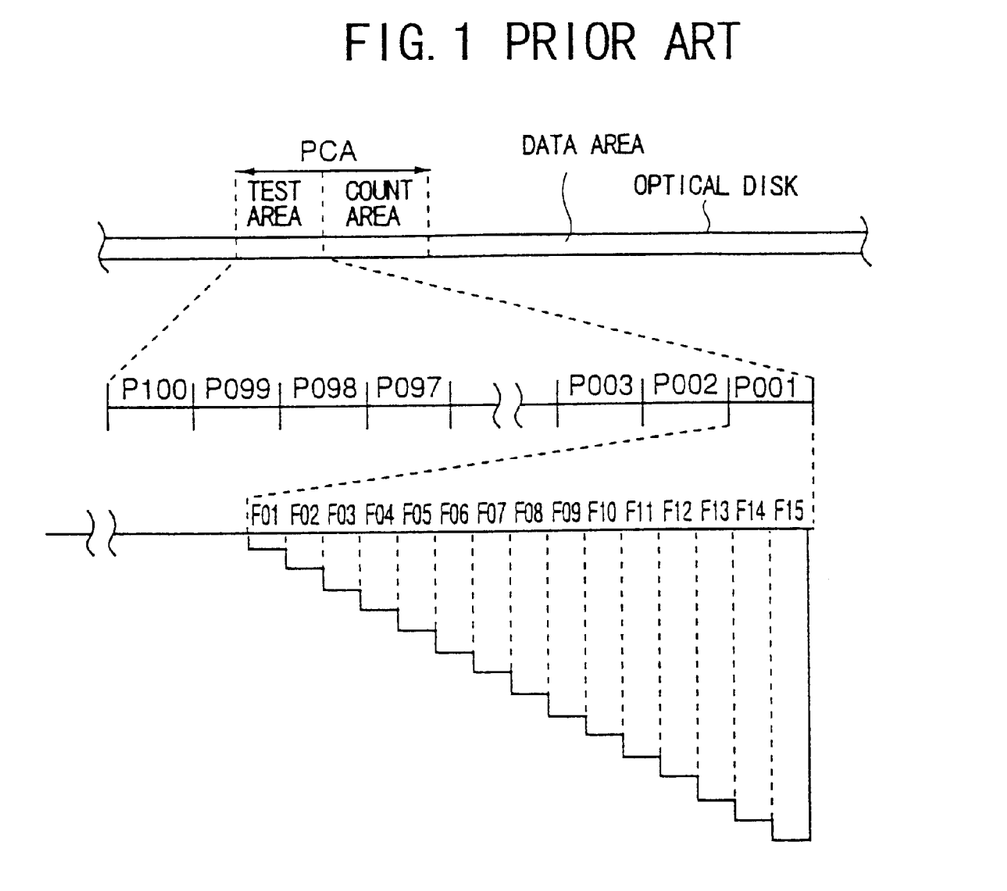
FIG. 1 is a diagram for illustrating a test recording area of an optical disk.

FIG. 1 is a diagram for illustrating the test recording area of the optical disk.

As shown in FIG. 1, a data area for storing a variety of data and a PCA (Power Calibration Area) that is a test recording area for setting the optimum write power of a laser beam are formed on the recording surface of the optical disk. The PCA, which is formed along a track closest to a disk center, includes a test area and a count area. The test area is formed of 100 partitions, and each partition is formed of 15 frames. In one OPC operation, one partition is used so that each frame of the partition is recorded with a test signal with a different level of the laser power. That is, the laser power has the 15 levels. Each test signal is an EFM-modulated signal formed of a pulse train having a pulse width three to ten times a reference pulse width T, and is recorded on each frame with pits of nine types of lengths. The reference pulse width T is for one cycle of a pulse signal having a frequency of 4.32 MHz, and is 230 nsec at a normal rate (1×).

Figure 2:
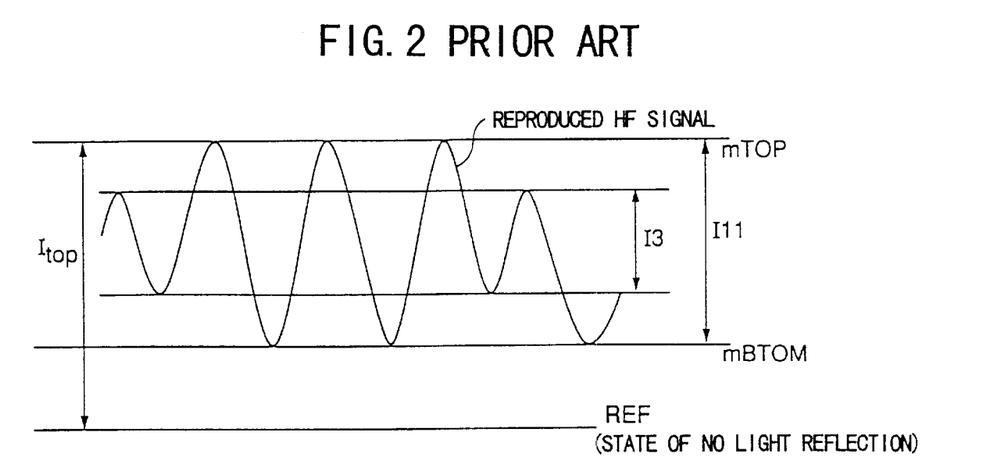
FIG. 2 is a diagram for illustrating a modulation degree m.
Figure 3:
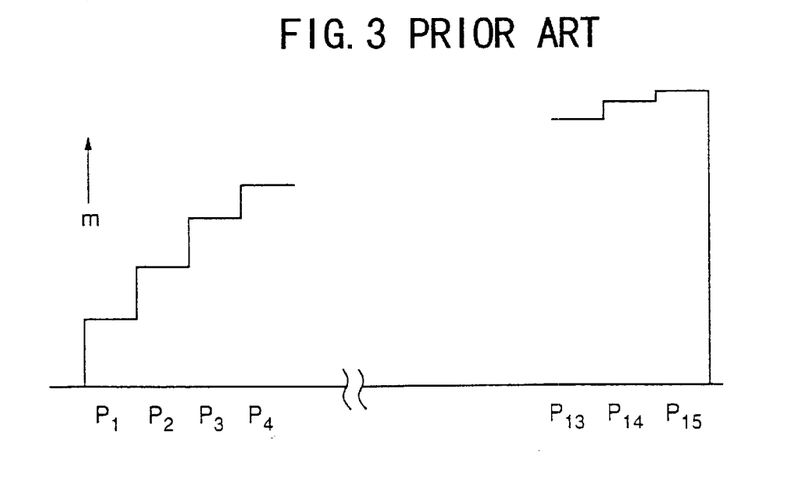
FIG. 3 is a diagram for illustrating a relation between a write power of a laser beam and the modulation degree m in an OPC operation.

The laser beam is emitted onto each frame so that each test signal is reproduced by detecting a light reflected back therefrom. At the same time, a modulation degree m as an index indicating the magnitude of the amplitude of each reproduced HF (high frequency) signal is measured by using the following equation $$m = I11/Itop \quad (1)$$

where I11 is an amplitude of a reproduced HF signal based on pits and lands (regions between pits) of a pulse width 11 times the reference pulse width T, and Itop is the optical reflectivity of the lands as shown in FIG. 2. In FIG. 2, I3 is an amplitude of the reproduced HF signal based on pits and lands of a pulse width three times the reference pulse width T. The modulation degree m differs depending on the level of the write power Pw. As shown in FIG. 3, as the level of the write power Pw becomes lowers, the modulation degree m becomes smaller because the amplitude of the reproduced HF signal becomes smaller. On the other hand, as the level of the write power Pw becomes higher, the modulation degree m becomes larger because the amplitude of the reproduced HF signal becomes larger.

In the case of determining the optimum write power Pwo by the modulation degree m, a method using a parameter γ obtained from the characteristic of the modulation degree m is employed. The parameter γ is given by the following equation $$\gamma = (dm/dPw) \times (Pw/m) \quad (2)$$

That is, the parameter γ is the differential of the characteristic of the modulation degree m. The optical disk is prerecorded with the target value γtarget of the parameter γ as ATIP (Absolute Time In Pregroove) information. Therefore, as show in FIG. 4, the characteristic of the parameter γ is obtained from the characteristic of the modulation degree m according to the above-described equation (2), and then a write power level Ptarget that realizes the target value γtarget is obtained. Since the optical disk is prerecorded with a coefficient ρ for obtaining the optimum write power Pwo from the write power level Ptarget as the ATIP information, the optimum write power Pwo is obtained, by using the coefficient ρ, from the following equation $$Pwo = \rho \times Ptarget \quad (3)$$

The optimum write power Pwo obtained from the above-described equation (3) is set and used as a write power at the time of a signal recording. The optimum erase power Peo is set, by using the optimum write power Pwo and a coefficient ε (a Pe/Pw ratio) recorded on the optical disk as the ATIP information, based on the following equation $$Peo = \epsilon \times Pwo \quad (4)$$

Figure 5:
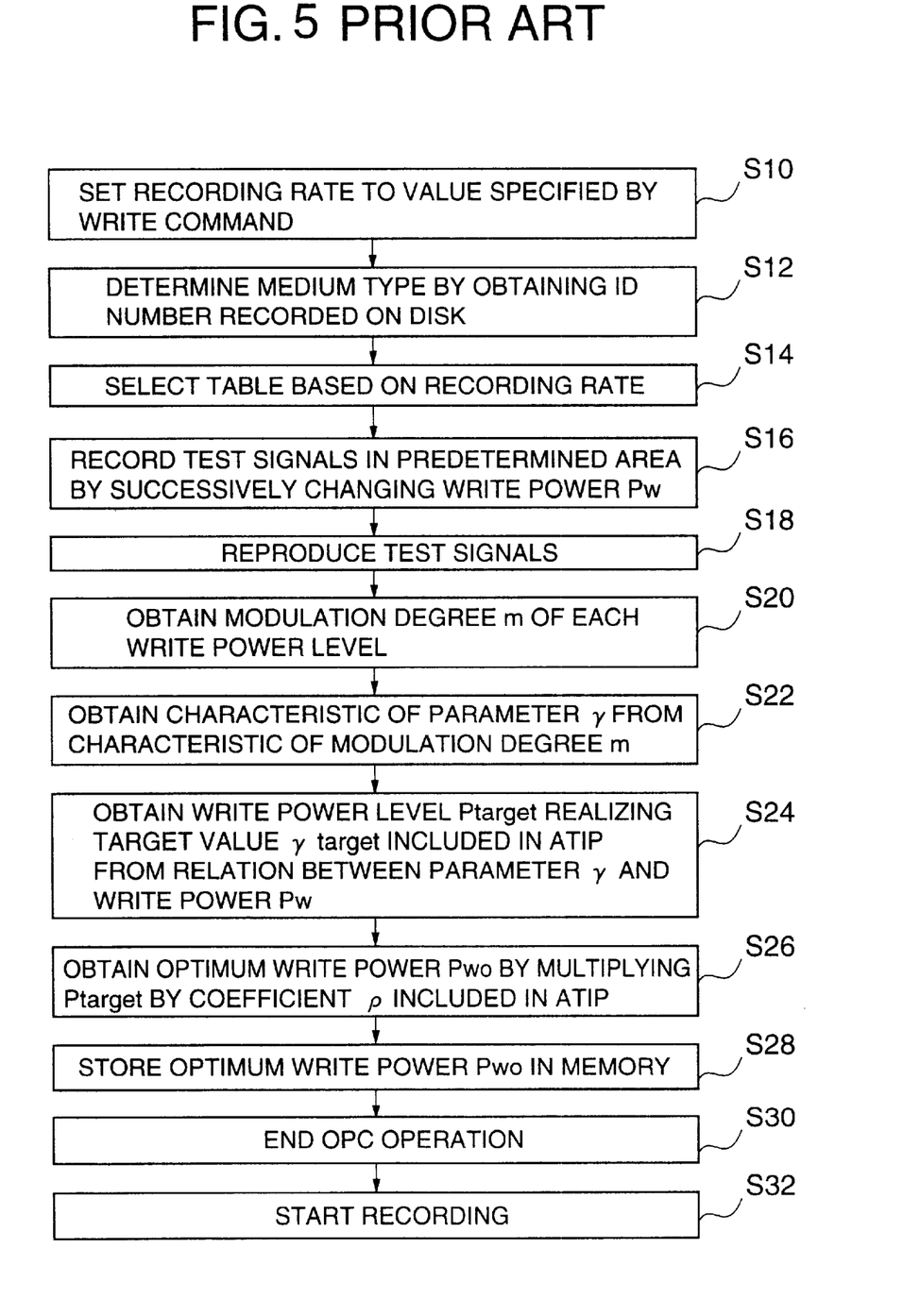
FIG. 5 is a flowchart of a conventional OPC operation.

FIG. 5 is a flowchart of a conventional OPC operation. In FIG. 5, in step S10, a recording rate is set to a value specified by a write command, and in step S12, a medium (optical disk) type is determined by obtaining an ID number recorded on the optical disk as the ATIP information.

Next, in step S14, a table storing a start power and a step power which table is prerecorded in memory is selected based on the recording rate. In step S16, the write power Pw is successively changed from the start power by the amount of the step power to have 15 different levels so that test signals are recorded in the test recording area of the optical disk.

Figure 4:
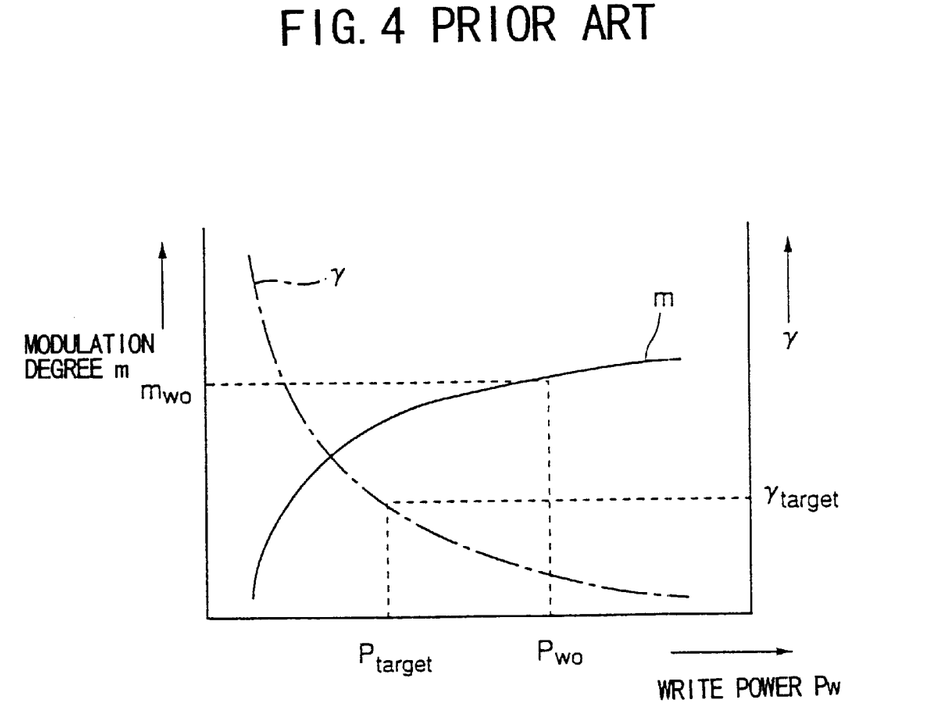
FIG. 4 is a diagram for illustrating a relation between the write power and the modulation degree in a test recording.

Next, in step S18, the test signals are reproduced, and in step S20, the modulation degree m is measured with respect to each of the 15 levels of the write power Pw so that the characteristic of the modulation degree m indicated by a solid line in FIG. 4 is obtained. The characteristic of the modulation degree m is a relation between the modulation degree m and the write power Pw of the 15 levels. Then, in step S22, the parameter γ is obtained with respect to each of the 15 levels of the write power Pw from the characteristic of the modulation degree m by using the equation (2). The parameter γ with respect to the modulation degree m is indicated by a dot-dash line in FIG. 4.

Next, in step S24, the write power level Ptarget realizing the target value γtarget included in the ATIP information of the optical disk is obtained from the characteristic of the parameter γ indicated by the dot-dash line in FIG. 4. Then, in step S26, the optimum write power Pwo is obtained by multiplying the write power level Ptarget by the coefficient ρ (a real number larger than or equal to one) included in the ATIP information, and in step S28, the optimum write power Pwo is stored in memory. Thereafter, in step S30, the OPC operation ends, and in step s32, a recording is started with the above-described optimum write power Pwo.

With respect to an erasable optical disk, since a saturated laser power deteriorates the durability of the optical disk, a laser power of a point at which a modulation degree starts to be saturated becomes an optimum laser power. However, a change in a modulation degree change rate (the parameter γ) is small at the point at which the modulation degree starts to be saturated. Therefore, a point at which a change in the modulation degree change rate is great (a point corresponding to a laser power smaller than the optimum power) is set as the target value γtarget, and the optimum write power Pwo is obtained by multiplying a power of the point by the coefficient ρ.

The characteristic of the modulation degree changes based on an error between drives, such as a modulation degree measurement offset due to a difference between the measurement circuits of the drives, or based on a difference between disks in each of which a relation between the optimum laser power and the modulation degree differs. Therefore, if the optimum laser power is obtained from a relation between the modulation degree change rate and the laser power, the obtained optimum laser power does not satisfy the recording characteristic of each drive and the durability of each disk.

However, according to the conventional OPC operation, if an error is caused in a measurement of the modulation degree m at the time of a test recording by an unevenly formed recording film of the optical disk or a fluctuation in the movement of the signal recording surface of the optical disk in rotation, an error is also caused in the parameter γ obtained from the characteristic of the modulation degree m. Thus, the optimum write power Pwo is prevented from being determined with accuracy since the optimum write power Pwo is obtained by using the parameter γ including the error.

Further, both of the characteristics of the modulation degree m and the parameter γ are different in the case of performing initial one hundred test recordings by using the PCA of the optical disk and in the case of performing test recordings after erasing the data of the initial one hundred test recordings from the PCA. Therefore, the optimum write power Pwo is prevented from being determined with accuracy and stability.

SUMMARY OF THE INVENTION

It is a general object of the present invention to provide an optical disk recording apparatus and a method of recording data on an optical disk in which the above-described disadvantages are eliminated.

A more specific object of the present invention is to provide an optical disk recording apparatus and a method of recording data on an optical disk which apparatus and method reduce the effect of a change in the characteristic of a modulation degree so as to determine an optimum write power level with accuracy.

The above-objects of the present invention are achieved by a recording apparatus for an erasable optical disk, which apparatus includes: a first determination part which determines a maximum of modulation degrees of signals reproduced from a test recording area of the optical disk, the signals being recorded in the test recording area with corresponding write power levels different from one another; and a second determination part which determines an optimum write power level corresponding to a target modulation degree obtained from the maximum of the modulation degrees based on a relation between the modulation degrees and the corresponding write power levels, wherein the recording apparatus records data on the optical disk with the optimum write power level.

The above objects of the present invention are also achieved by a method of recording data on an erasable optical disk, which method includes the steps of (a) determining a maximum of modulation degrees of signals reproduced from a test recording area of the optical disk, the signals being recorded in the test recording area with corresponding write power levels different from one another, (b) obtaining a target modulation degree from the maximum of the modulation degrees, (c) determining an optimum write power level corresponding to the target modulation degree based on a relation between the modulation degrees and the corresponding write power levels, and (d) recording the data on the optical disk with the optimum write power level.

According to a conventional method employing a parameter γ obtained from the characteristic of the modulation degree in determining the optimum write power, if an error is caused in a measurement of the modulation degree, it is natural that an error should also be caused in the parameter γ, thus preventing the optimum write power from being determined with accuracy. However, according to the above-described apparatus and method of the present invention, the optimum write power is determined based on the maximum of the modulation degrees. Since the maximum of the modulation degrees is obtained around a saturation point of the modulation degree where a change in the modulation degree is about to be minimized with respect to the write power level, the maximum of the modulation degrees can be measured with stability even when the write power level is changed in an OPC operation. Therefore, by normalization using the maximum of the modulation degrees, a variation in the characteristic of the modulation degree due to a drive or disk difference can be absorbed, and an effect of a measurement error of the modulation degree in an OPC operation can be reduced. Therefore, the optimum write power can be determined with good accuracy.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description will now be given, with reference to the accompanying drawings, of an embodiment of the present invention.

Figure 6:
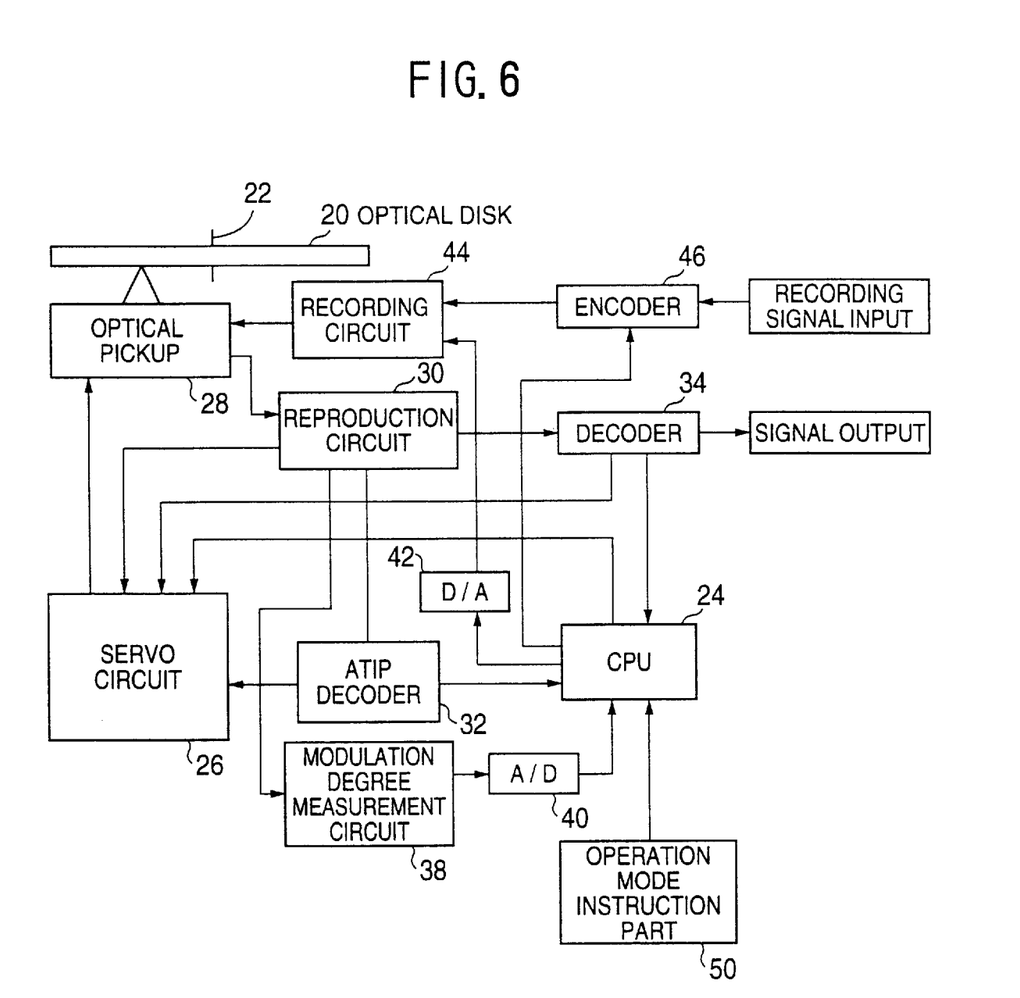
FIG. 6 is a block diagram of an optical disk recording apparatus according to an embodiment of the present invention.

FIG. 6 is a block diagram of an optical disk recording apparatus according to the embodiment of the present invention. In the drawing, an optical disk 20 is driven by a spindle motor (not shown) to rotate on a shaft 22. A CPU 24 supplies a command to a servo circuit 26 based on a write or read command supplied from a host computer (not shown).

The servo circuit 26 performs the CLV (Constant Linear Velocity) servo of the above-mentioned spindle motor. The servo circuit 26 further controls the rotation of the thread motor (not shown) of an optical pickup 28 so as to move the optical pickup 28 to a desired block, and performs the focus servo and tracking servo of the optical pickup 28.

A laser beam emitted from the optical pickup 28 is reflected back from the recording surface of the optical disk 20 to be detected by the optical pickup 28. A reproduced HF signal obtained by the optical pickup 28 is supplied to and amplified in a reproduction circuit 30. The amplified reproduced HF signal is supplied to the servo circuit 26 while an ATIP signal separated from the amplified reproduced HF signal EFM-demodulated in the reproduction circuit 30 is supplied to an ATIP decoder 32. Further, the demodulated signal with which synchronization is established is supplied to a decoder 34 to be output therefrom as reproduced data after being subjected to CIRC (Cross-Interleave Reed-Solomon Code) decoding and error correction. The ATIP decoder 32 decodes ATIP information including an ID number and a variety of parameters and supplies the decoded ATIP information to the CPU 24 and the servo circuit 26.

The reproduction circuit 30 also supplies the reproduced HF signal to a modulation degree measurement circuit 38 that measures a modulation degree m of the reproduced HF signal. The modulation degree m is digitized in an analog-to-digital (A/D) converter 40 and is supplied therefrom to the CPU 24.

The CPU 24 generates a write power control signal based on the modulation degree m. The write power control signal is converted into an analog signal in a digital-to-analog (D/A) converter 42 to be supplied to a recording circuit 44 as a write power control voltage. An encoder 46 CIRC-encodes an input signal to be recorded based on the control of the CPU 24 and supplies the encoded signal to the recording circuit 44.

The recording circuit 44 EFM-modulates the signal supplied from the encoder 46 at the time of a recording, and controls the encoded signal so that the encoded signal has a write power corresponding to the write power control voltage. Then, the encoded signal is supplied to the optical pickup 28 to drive a laser diode (LD) thereof so that the laser beam is emitted onto the optical disk 20 for a signal recording.

A memory (RAM) housed in the CPU 24 stores the history of past OPC operations, that is, optimum write powers measured in the past. The history of the past OPC operations is stored for a certain period of time.

Further, a memory (ROM) housed in the CPU 24 stores tables corresponding to optical disk types (ID numbers) and recording rates of 1×, 2×, 4×, and 10× as well as tables each storing OPC operation start and step powers corresponding to the optical disk types and recording rates. An operation mode instruction part 50 supplies an instruction to the CPU 24.

Figure 7:
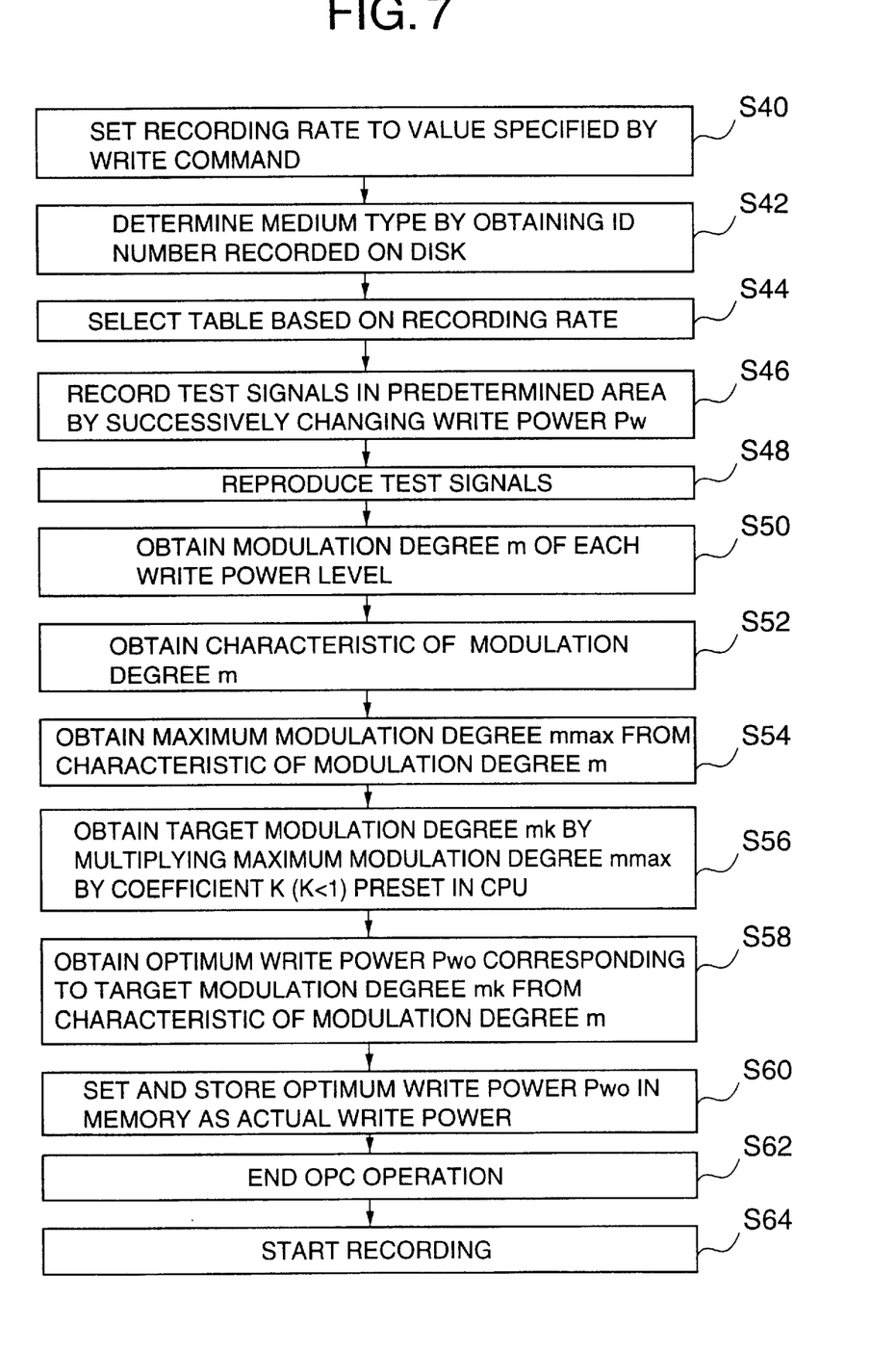
FIG. 7 is a flowchart of an OPC operation performed by a CPU of the optical disk recording apparatus of FIG. 6.

FIG. 7 is a flowchart of an OPC operation performed by the CPU 24. In the drawing, in step S40, a recording rate is set to a value specified by a write command, and in step S42, an optical disk type (a medium type) is determined by obtaining an ID number recorded on the optical disk 20 as the ATIP information. Next, in step S44, one of the tables stored in the ROM is selected based on the recording rate, and in step S46, a write power Pw is successively changed from the start power by the amount of the step power to have 15 different levels so that test signals are recorded in the test recording area of the optical disk 20.

Figure 8:
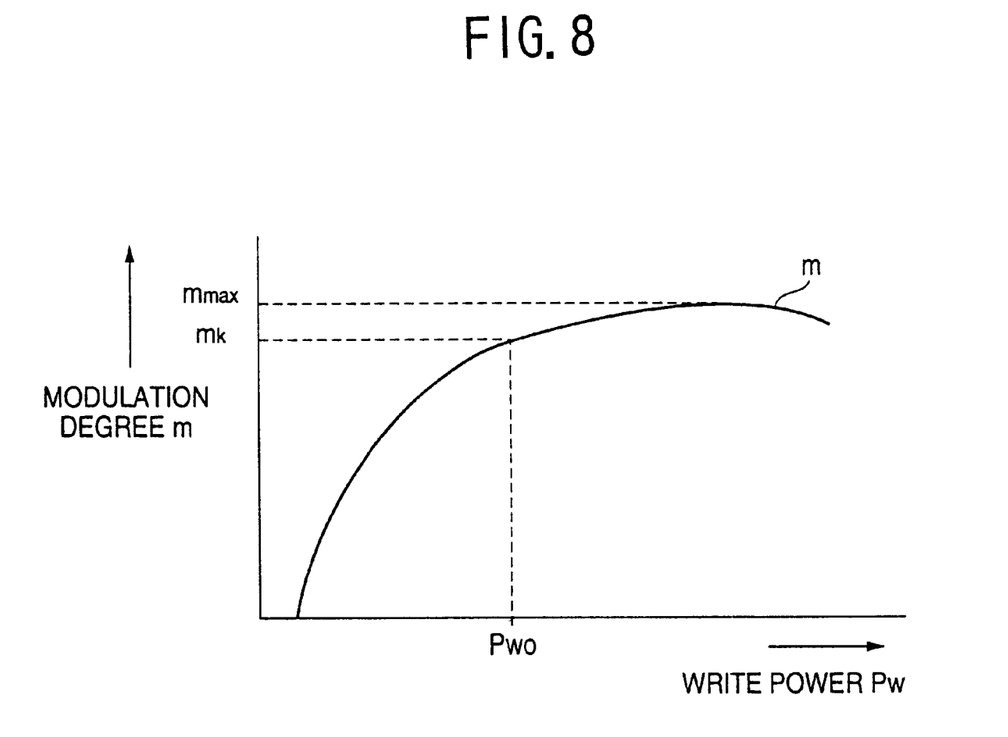
FIG. 8 is a diagram showing a relation between a write power of a laser beam and a modulation degree m according to the embodiment of the present invention.

Next, in step S48, the test signals are reproduced, and in step S50, the modulation degree m is measured with respect to each of the 15 levels of the write power Pw. Then, in step S52, the characteristic of the modulation degree m indicated by a solid line in FIG. 8 is obtained. Thereafter, in step S54, a maximum value of the modulation degree m (a maximum modulation degree mmax) is obtained from the characteristic of the modulation degree m shown in FIG. 8. Next, in step S56, a target modulation degree mk is obtained by multiplying the maximum modulation degree mmax by a coefficient K prerecorded in the ROM. Here, the coefficient K is a real number smaller than one, such as a value around 0.8.

Next, in step S58, an optimum write power Pwo corresponding to the target modulation degree mk is obtained from the characteristic of the modulation degree m shown in FIG. 8. Then, in step S60, the optimum write power Pwo is set and stored in the RAM as an actual write power. Thereafter, in step S62, the OPC operation ends, and in step S64, a recording is started.

According to a conventional method employing the above-described parameter γ in determining the optimum write power Pwo, if an error is caused in a measurement of the modulation degree m, it is natural that an error should also be caused in the parameter γ, thus preventing the optimum write power Pwo from being determined with accuracy. However, according to the present invention, the optimum write power Pwo is determined based on the maximum modulation degree mmax. As shown in FIG. 8, as the level of the write power Pw becomes lowers, the modulation degree m becomes smaller because the amplitude of the reproduced HF signal becomes smaller. On the other hand, as the level of the write power Pw becomes higher, the modulation degree m becomes larger up to the maximum modulation degree mmax because the amplitude of the reproduced HF signal becomes larger. Since the maximum modulation degree mmax is obtained around a saturation point of the modulation degree m where a change in the modulation degree m is about to be minimized with respect to the write power level, the maximum modulation degree Mmax can be measured with stability even when the write power level is changed in an OPC operation. Therefore, by normalization using the maximum modulation degree mmax, a variation in the characteristic of the modulation degree m due to a drive or disk difference can be absorbed, and an effect of a measurement error of the modulation degree m in an OPC operation can be reduced. Therefore, the optimum write power Pwo can be determined with good accuracy.

In FIG. 7, steps 40 through 54 correspond to a maximum modulation degree determination part (a first determination part), and steps 56 through 60 correspond to an optimum write power determination part (a second determination part) of the optical disk recording apparatus according to the embodiment of the present invention, respectively.

The present invention is not limited to the specifically disclosed embodiment, but variations and modifications may be made without departing from the scope of the present invention.

The present application is based on Japanese priority application No. 2000-119439 filed on Apr. 20, 2000, the entire contents of which are hereby incorporated by reference.

What is claimed is:

1. A recording apparatus for an erasable optical disk, comprising:

a first determination part which determines a range for the maximum modulation degrees of signals reproduced from a test recording area of the optical disk so that the signals being recorded in the test recording area correspond to different levels of write power within said determined range of maximum modulation degrees; and a second determination part which determines an optimum level of the write power corresponding to a target modulation degree obtained from the maximum of the modulation degrees based on a relation between the modulation degrees and the corresponding levels of the write power, wherein the recording apparatus records data on the optical disk at an optimum level of write power.

2. The recording apparatus as claimed in claim 1, wherein the second determination part obtains the target modulation degree by multiplying the maximum of the modulation degrees by a predetermined value.

3. The recording apparatus as claimed in claim 2, wherein the predetermined value is a real number less than one.

4. A method of recording data on an erasable optical disk, comprising the steps of:

(a) determining a range for the maximum modulation degrees of signals reproduced from a test recording area of the optical disk so that the signals being recorded in the test recording area correspond to different levels of write power within said range of maximum modulation degrees;

(b) obtaining a target modulation degree from the maximum of the modulation degrees;

(c) determining an optimum level of write power corresponding to the target modulation degree based on a relation between the modulation degrees and the corresponding levels of write power; and (d) recording the data on the optical disk with an optimum level of write power.

5. The method as claimed in claim 4, wherein said step (b) obtains the target modulation degree by multiplying the maximum of the modulation degrees by a predetermined value.

6. The method as claimed in claim 5, wherein the predetermined value is a real number less than one.

* * * * *